United States Patent
Lu et al.

(10) Patent No.: US 8,369,475 B2
(45) Date of Patent: Feb. 5, 2013

(54) NUCLEAR FUEL ASSEMBLY SUPPORT GRID

(75) Inventors: Yong (Roger) Lu, Columbia, SC (US); Xiaoyan (Jane) Jiang, Columbia, SC (US); Michael E. Conner, Elgin, SC (US); Paul M. Evans, Chapin, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 672 days.

(21) Appl. No.: 12/609,259

(22) Filed: Oct. 30, 2009

(65) Prior Publication Data

US 2011/0002436 A1 Jan. 6, 2011

Related U.S. Application Data (63) Continuation-in-part of application No. 12/495,873, filed on Jul. 1, 2009.

(51) Int. Cl.
*G21C 3/352* (2006.01)
*G21C 3/34* (2006.01)
*G21C 3/00* (2006.01)

(52) U.S. Cl. ......... 376/438; 376/409; 376/426; 376/434

(58) Field of Classification Search .................. 376/302, 376/303, 347, 353, 361–364, 395, 399, 409, 376/438–442, 453, 462, 426, 434, 446, 448, 376/454

See application file for complete search history.

(56) References Cited

U.S. PATENT DOCUMENTS

| | | | | |
|---|---|---|---|---|
| 3,957,575 | A | * | 5/1976 | Fauth et al. ............... 376/438 |
| 4,325,786 | A | * | 4/1982 | Wohlsen ................. 376/442 |
| 4,576,786 | A | * | 3/1986 | DeMario ................. 376/439 |
| 4,702,881 | A | * | 10/1987 | Weiland et al. ........... 376/442 |
| 4,716,015 | A | * | 12/1987 | Carlson .................. 376/454 |
| 4,716,016 | A | * | 12/1987 | Demario et al. .......... 376/446 |
| 4,762,669 | A | * | 8/1988 | Doshi .................... 376/442 |
| 4,900,508 | A | | 2/1990 | Anthony |
| 4,957,697 | A | * | 9/1990 | Wada ..................... 376/442 |
| 5,253,278 | A | * | 10/1993 | Kanazawa et al. ......... 376/439 |
| 5,371,769 | A | * | 12/1994 | Kato et al. .............. 376/442 |
| 5,396,526 | A | * | 3/1995 | Ohuchi et al. ........... 376/446 |
| 5,515,408 | A | * | 5/1996 | Oyama et al. ............ 376/438 |
| 5,638,416 | A | * | 6/1997 | Oyama et al. ............ 376/442 |
| 5,966,419 | A | * | 10/1999 | Petit .................... 376/441 |
| 6,278,758 | B1 | * | 8/2001 | Imaizumi et al. ......... 376/438 |
| 6,522,710 | B2 | * | 2/2003 | Smith et al. ............. 376/442 |
| 6,606,369 | B1 | | 8/2003 | Smith, III et al. |
| 6,819,733 | B2 | | 11/2004 | Broders et al. |
| 7,085,340 | B2 | * | 8/2006 | Goldenfield et al. ...... 376/438 |
| 7,548,602 | B2 | * | 6/2009 | Smith et al. ............. 376/439 |
| 2003/0007590 | A1 | * | 1/2003 | Smith et al. ............. 376/442 |
| 2005/0069080 | A1 | * | 3/2005 | Goldenfield et al. ...... 376/438 |
| 2006/0222140 | A1 | * | 10/2006 | Aleshin et al. ........... 376/434 |
| 2006/0227925 | A1 | * | 10/2006 | Marzean ................. 376/438 |
| 2007/0211843 | A1 | * | 9/2007 | Smith et al. ............. 376/438 |

* cited by examiner

*Primary Examiner* — Bernarr Gregory (57) ABSTRACT

A nuclear fuel assembly support grid formed from an array of a plurality of orthogonally arranged straps in an egg-crate configuration with angled trailing and/or leading edges that are designed to break the correlation of vortices shed from the edges of the grid straps by varying the phase of the vortices to avoid resonant vibration of the straps.

39 Claims, 11 Drawing Sheets

NUCLEAR FUEL ASSEMBLY SUPPORT GRID

RELATED APPLICATIONS

This application is a continuation-in-part of application Ser. No. 12/495,873, filed Jul. 1, 2009.

BACKGROUND OF THE INVENTION

1. Field of the Invention

This invention pertains generally to a nuclear reactor fuel assembly and more particularly to a nuclear fuel assembly that employs a spacer grid that minimizes flow induced vibration.

2. Description of the Related Art

The primary side of nuclear reactor power generating systems which are cooled with water under pressure comprises a closed circuit which is isolated and in heat exchange relationship with a secondary circuit for the production of useful energy. The primary side comprises the reactor vessel enclosing a core internal structure that supports a plurality of fuel assemblies containing fissile material, the primary circuit within heat exchange steam generators, the inner volume of a pressurizer, pumps and pipes for circulating pressurized water; the pipes connecting each of the steam generators and pumps to the reactor vessel independently. Each of the parts of the primary side comprising a steam generator, a pump, and a system of pipes which are connected to the vessel form a loop of the primary side.

Figure 1:
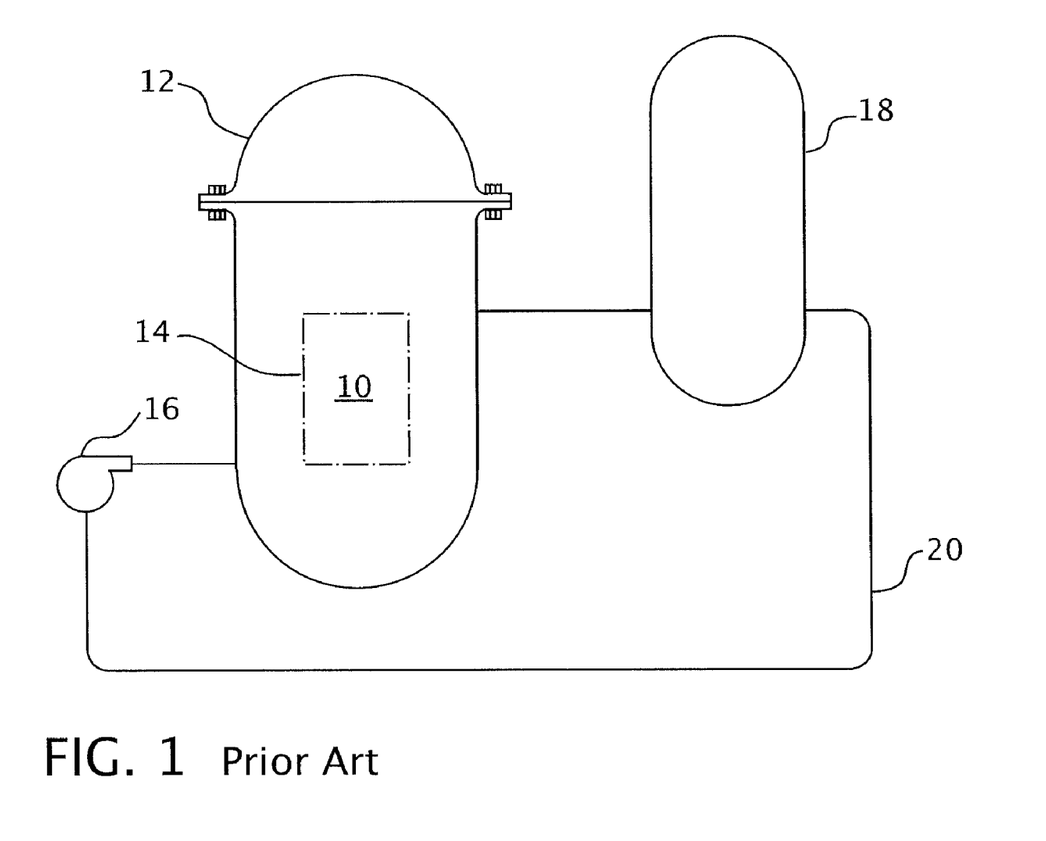
FIG. 1 is a simplified schematic of a nuclear reactor system to which this invention can be applied.

For the purpose of illustration, FIG. 1 shows a simplified nuclear reactor primary system, including a generally cylindrical reactor pressure vessel 10 having a closure head 12 enclosing a nuclear core 14. A liquid reactor coolant, such as water, is pumped into the vessel 10 by pump 16 through the core 14 where heat energy is absorbed and is discharged to a heat exchanger 18, typically referred to as a steam generator, in which heat is transferred to a utilization circuit (not shown), such as a steam driven turbine generator. The reactor coolant is then returned to the pump 16, completing the primary loop. Typically, a plurality of the above-described loops are connected to a single reactor vessel 10 by reactor coolant piping 20.

Figure 2:
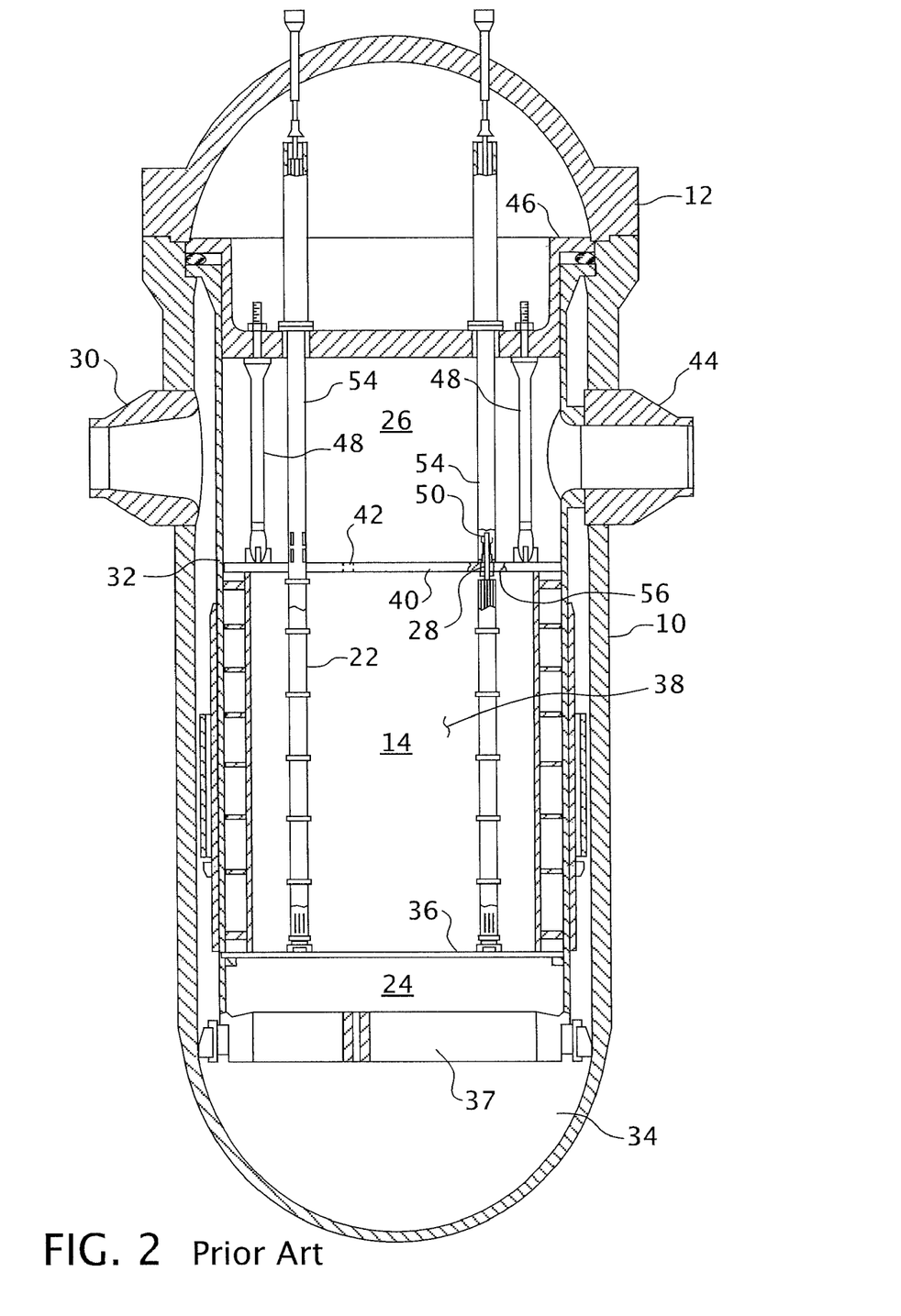
FIG. 2 is an elevational view, partially in section, of a nuclear reactor vessel and internal components to which this invention can be applied.

An exemplary reactor design is shown in more detail in FIG. 2. In addition to the core 14 comprised of a plurality of parallel, vertical, co-extending fuel assemblies 22, for purposes of this description, the other vessel internal structures can be divided into the lower internals 24 and the upper internals 26. In conventional designs, the lower internals' function is to support, align and guide core components and instrumentation as well as direct flow within the vessel. The upper internals restrain or provide a secondary restraint for the fuel assemblies 22 (only two of which are shown for simplicity in FIG. 2), and support and guide instrumentation and components, such as control rods 28. In the exemplary reactor shown in FIG. 2, coolant enters the reactor vessel 10 through one or more inlet nozzles 30, flows down through an annulus between the vessel and the core barrel 32, is turned 180° in a lower plenum 34, passes upwardly through a lower support plate 37 and a lower core plate 36 upon which the fuel assemblies are seated and through and about the assemblies. In some designs, the lower support plate 37 and the lower core plate 36 are replaced by a single structure, a lower core support plate having the same elevation as 37. The coolant flow through the core and surrounding area 38 is typically large on the order of 400,000 gallons per minute at a velocity of approximately 20 feet per second. The resulting pressure drop and frictional forces tend to cause the fuel assemblies to rise, which movement is restrained by the upper internals, including a circular upper core plate 40. Coolant exiting the core 14 flows along the underside of the upper core plate 40 and upwardly through a plurality of perforations 42. The coolant then flows upwardly and radially to one or more outlet nozzles 44.

The upper internals 26 can be supported from the vessel or the vessel head and include an upper support assembly 46. Loads are transmitted between the upper support assembly 46 and the upper core plate 40, primarily by a plurality of support columns 48. A support column is aligned above a selected fuel assembly 22 and perforations 42 in the upper core plate 40.

Rectilinearly movable control rods 28, which typically include a drive shaft 50 and a spider assembly 52 of neutron poison rods, are guided through the upper internals 26 and into aligned fuel assemblies 22 by control rod guide tubes 54. The guide tubes are fixedly joined to the upper support assembly 46 and the top of the upper core plate 40. The support column 48 arrangement assists in retarding guide tube deformation under accident conditions which could detrimentally affect control rod insertion capability.

Figure 3:
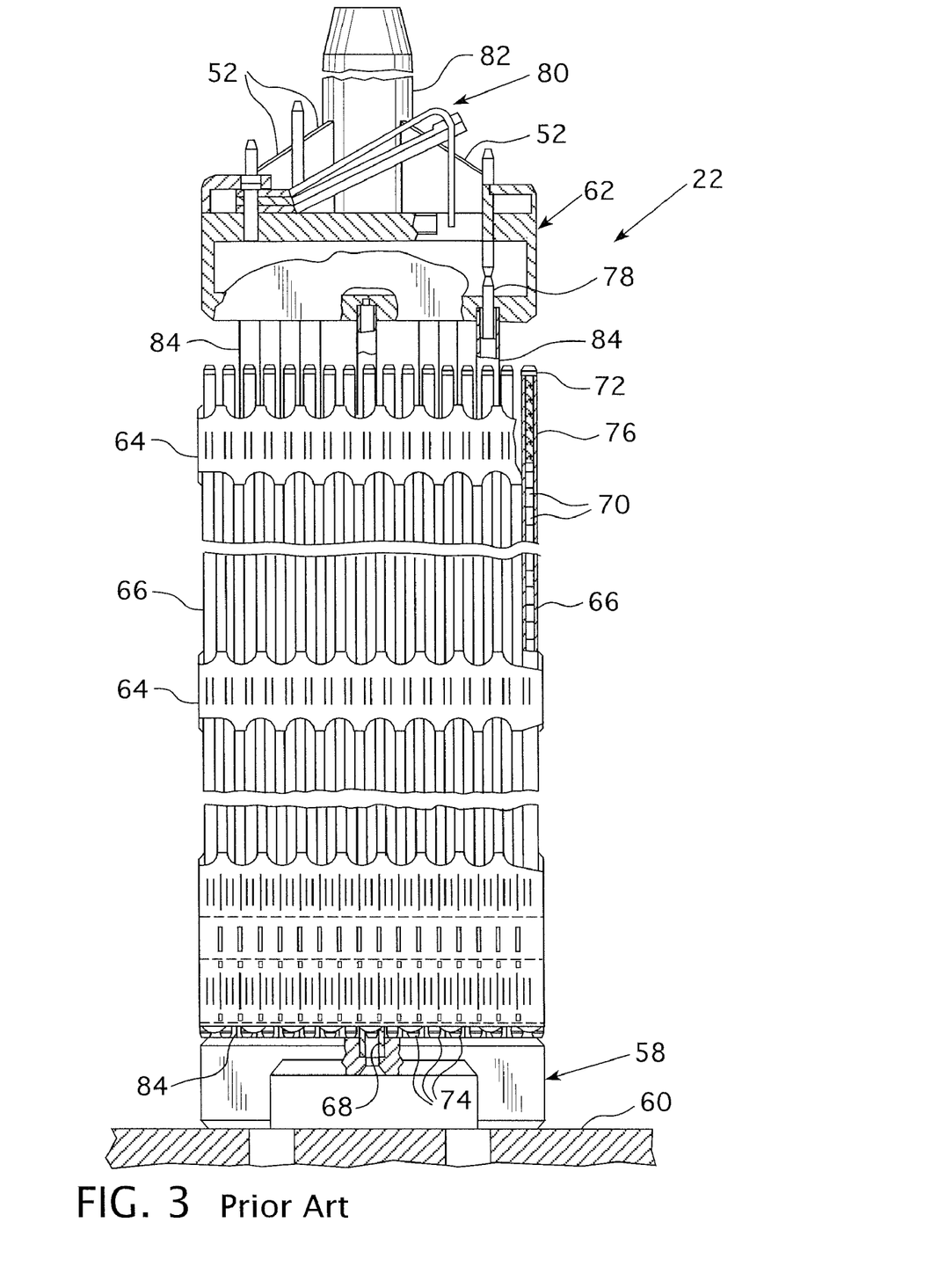
FIG. 3 is an elevational view, partially in section, of a fuel assembly illustrated in vertically shortened form, with parts broken away for clarity.

FIG. 3 is an elevational view, represented in vertically shortened form, of a fuel assembly being generally designated by reference character 22. The fuel assembly 22 is the type used in a pressurized water reactor and has a structural skeleton which, at its lower end includes a bottom nozzle 58. The bottom nozzle 58 supports the fuel assembly 22 on a lower core plate 60 in the core region of the nuclear reactor (the lower core plate 60 is represented by reference character 36 in FIG. 2). In addition to the bottom nozzle 58, the structural skeleton of the fuel assembly 22 also includes a top nozzle 62 at its upper end and a number of guide tubes or thimbles 84 which align with the guide tubes 54 in the upper internals. The guide tubes or thimbles 84 extend longitudinally between the bottom and top nozzles 58 and 62 and at opposite ends are rigidly attached thereto.

Figure 4:
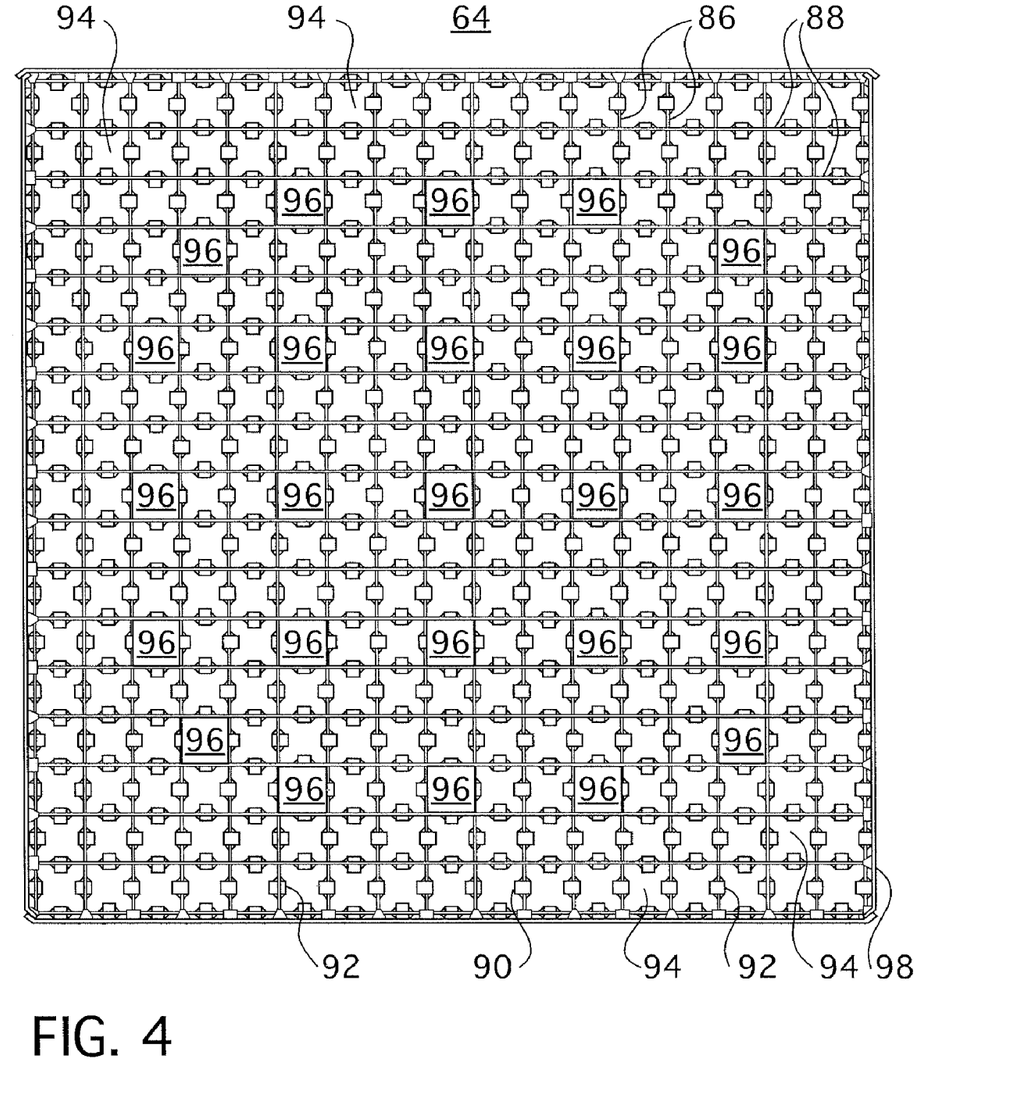
FIG. 4 is a plan view of an egg-crate support grid of this invention.

The fuel assembly 22 further includes a plurality of transverse grids 64 axially spaced along and mounted to the guide thimbles 84 and an organized array of elongated fuel rods 66 transversely spaced and supported by the grids 64. A plan view of a grid 64 without the guide thimbles 84 and fuel rod 66 is shown in FIG. 4. The guide thimbles 84 pass through the cells labeled 96 and the fuel rods occupy the cells 94. As can be seen from FIG. 4, the grids 64 are conventionally formed from an array of orthogonal straps 86 and 88 that are interleaved in an egg-crate pattern with the adjacent interface of four straps defining approximately square support cells through which the fuel rod 66 are supported in the cells 94 in transverse, spaced relationship with each other. In many designs, springs 90 and dimples 92 are stamped into the opposite walls of the straps that form the support cells 94. The springs and dimples extend radially into the support cells and capture the fuel rod 66 therebetween; exerting pressure on the fuel rod cladding to hold the rods in position. The orthogonal array of straps 86 and 88 is welded at each strap end to a bordering strap 98 to complete the grid structure 64. Also, the assembly 22, as shown in FIG. 3, has an instrumentation tube 68 located in the center thereof that extends between and is captured by the bottom and top nozzles 58 and 62. With such an arrangement of parts, fuel assembly 22 forms an integrally unit capable of being conveniently handled without damaging the assembly of parts.

As mentioned above, the fuel rod 66 in the array thereof in the assembly 22 are held in spaced relationship with one another by the grids 64 spaced along the fuel assembly length. Each fuel rod 66 includes a plurality of nuclear fuel pellets 70 and is closed at its opposite ends by upper and lower end plugs 72 and 74. The pellets 70 are maintained in a stack by a plenum spring 76 disposed between the upper end plug 72 and the top of the pellet stack. The fuel pellets 70, composed of fissile material, are responsible for creating the reactive power of the reactor. The cladding which surrounds the pellets functions as a barrier to prevent the fission by-products from entering the coolant and further contaminating the reactor system.

To control the fission process, a number of control rods 78 are reciprocally moveable in the guide thimbles 84 located at predetermined positions in the fuel assembly 22. The guide thimble locations can be specifically seen in FIG. 4 represented by reference character 96, except for the center location which is occupied by the instrumentation tube 68. Specifically, a rod cluster control mechanism 80, positioned above the top nozzle 62, supports a plurality of the control rods 78. The control mechanism has an internally threaded cylindrical hub member 82 with a plurality of radially extending flukes or arms 52 that form the spider previously noted with regard to FIG. 2. Each arm 52 is interconnected to a control rod 78 such that the control rod mechanism 80 is operable to move the control rods vertically in the guide thimbles 84 to thereby control the fission process in the fuel assembly 22, under the motive power of a control rod drive shaft 50 which is coupled to the control rod hub 80, all in a well known manner.

As mentioned above, the fuel assemblies are subject to hydraulic forces that exceed the weight of the fuel rods and thereby exert significant forces on the fuel rods and the assemblies. In addition, there is significant turbulence in the coolant in the core caused by mixing vanes on the upper surfaces of the straps of many grids which promote the transfer of heat from the fuel rod cladding to the coolant. The substantial flow forces and turbulence can result in resonant vibration of the grid straps which results from vortex shedding lock-in vibration when the shedding frequency is close to the natural frequency of the strap. The resonant vibration can cause severe fretting of the fuel rod cladding if the relative motion between the grid strap and the fuel rod is not restrained. Fretting of the fuel rod cladding can lead to a breach and expose the coolant to the radioactive byproduct within the fuel rods. Another potential problem with resonant grid strap vibration is that fatigue could occur in the grid straps causing grid strap cracking (or other damage to the straps).

Thus, an improved means of supporting the fuel rods within a fuel assembly grid is desired that will better resist resonant vibration of the grid straps.

SUMMARY OF THE INVENTION

This invention achieves the foregoing objective by providing an enhanced nuclear fuel assembly for supporting a spaced, parallel array of a plurality of elongated nuclear fuel rods between a lower nozzle and upper nozzle. A plurality of improved support grids are arranged in tandem spaced along the axial length of the fuel rods between the upper nozzle and the lower nozzle, at least partially enclosing an axial portion of the circumference of each fuel rod within a support cell of the support grids to maintain a lateral spacing between fuel rods. At least one of the support grids comprises a plurality of elongated, intersecting straps that define the support cells at the intersection of each four adjacent straps that surround the nuclear fuel rods. A length of each strap along its elongated dimension, between the intersections of the four adjacent straps, forms a wall of the corresponding support cell, with each wall of the cells that surround fuel rods having a lower leading edge and an upper trailing edge that are substantially in the plane of the corresponding strap. At least one of the leading edge and the trailing edge extends in between the intersections of adjacent straps, at an angle substantially deviating from an angle of an axis of the elongated dimension of the straps.

In one preferred embodiment, the improved grid structure of this invention has the grid straps interleaved in an egg-crate arrangement and preferably the walls of the intersecting straps are at substantially the same height at the intersection. Desirably, the angle of deviation of the leading edge and trailing edge includes a first angle and a second angle and the lower leading edge and the upper trailing edge extend from the intersection between straps, respectively, at the first and second angles. In one embodiment, the first and second angles are in the same direction. In a second embodiment, the first and second angles are in opposite directions and in still another embodiment the first and second angles are equal.

In another preferred embodiment, one or both of the leading edge or trailing edge of at least one wall of at least some of the cells that surround fuel rods starts at a first elevation at a first of the intersections between straps and extends along the elongated dimension of the corresponding strap to a second elevation before intersecting with an adjacent orthogonal strap. Desirably, the second elevation is either higher or lower than the first elevation. In an alternate embodiment, wherein one or both of the leading edge or the trailing edge extends from the second elevation to a third elevation before the intersection with an adjacent orthogonal strap, the third elevation is different than the second elevation. In one embodiment, the second elevation is higher than the first and third elevations on the leading edge and the second elevation is lower than the first and third elevations on the trailing edge.

In still another embodiment, the second elevation is at the intersection of the adjacent orthogonal strap and the second elevation is one of either greater or lesser than the first elevation. Desirably, one or both of the leading edge or the trailing edge extends along the elongated dimension of the strap from the adjacent orthogonal intersecting strap to a third elevation at the intersection of a third orthogonal strap wherein the third elevation is the other of either the greater or lesser than the second elevation. Preferably, the first and third elevations are substantially the same. Preferably, either one or both of the leading edge or the trailing edge on adjacent, opposing, parallel straps have the same undulating pattern, but opposing walls are 180° out of phase.

Desirably, at least some of the walls of the support cells include a dimple that has a saw tooth opening cut in the wall below the dimple and preferably the dimple is substantially rounded at a plurality of corners at which it changes it direction into the support cell. In still another embodiment, at least some of the walls of the support cells that include a dimple that has a saw tooth opening below the dimple also include a saw tooth ligament as the trailing edge.

In yet another embodiment either the leading edge, the trailing edge or both the leading edge and the trailing edge are formed from a cutout in the wall of the support cell. The term "cutout" is used in a very general sense to refer to an opening in the cell wall regardless of how formed. The cutout has at least a first side that is inclined towards a second side with the first and second sides connected at the bottom with a smooth curved transition. Preferably the cutout extends substantially over the width of the wall and in one embodiment the leading edge is above a bottom edge of the grid strap. In the case where the support cell wall has either a dimple or spring protruding into the support cell, the cutout that forms the leading edge is formed between the bottom edge of the strap and the dimple or spring.

In one embodiment the cutout is in the form of a triangle having a relatively flat horizontal base at the top and a rounded lower tip. Preferably the angle of the first and second sides with each other is between 20 and 160 degrees with the optimal angle between 60 and 90 degrees. With the radius at the rounded lower tip defined by a ratio of the radius of the curvature of the lower tip to the depth (height) of the triangle, the ratio is preferably between 0.1 and 0.9 and most desirably between 0.5 and 0.7. Preferably the ratio of the width of the cutout to the width of the wall is between 0.1 and 0.9 and most desirably between 0.5 and 0.85.

In still another embodiment the leading edge, the trailing edge or both the leading edge and the trailing edge are formed substantially as a half circle with the open end at the top. Preferably, the ratio of the height of the half circle to the width of the half circle at its widest point is approximately 0.5; and the ratio of the width of the half circle at its widest point to the width of the support cell is between 0.2 to 0.9 with an optimal range of 0.4 to 0.6.

BRIEF DESCRIPTION OF THE DRAWINGS

A further understanding of the invention can be gained from the following description of the preferred embodiments when read in conjunction with accompanying drawings in which.

DESCRIPTION OF THE PREFERRED EMBODIMENT

This invention provides a new fuel assembly for a nuclear reactor and more particularly an improved spacer grid design for a nuclear fuel assembly. The improved grid is generally formed from a matrix of approximately square (or hexagonal) cells, some of which 94 support fuel rods while others of which 96 are connected to guide thimbles and a central instrumentation tube. The plan view shown in FIG. 4 looks very much like the prior art grids since the contour of the individual grid straps 86 and 88 are not regularly apparent from this view, but can be better appreciated from the view shown in FIGS. 5-12. The grid of this embodiment is formed from two orthogonally positioned sets of parallel, spaced straps 86 and 88, that are interleaved in a conventional manner and surrounded by an outer strap 98 to form the structural makeup of the grid 64. Though orthogonal straps 86 and 88 forming substantially square fuel rod support cells are shown in this embodiment, it should be appreciated that this invention can be applied equally as well to other grid configurations, e.g., hexagonal grids. The orthogonal straps 86 and 88, and in the case of the outer rows, the outer strap 98 define the support cells 94 at the intersection of each four adjacent straps that surround the nuclear fuel rods 66. A length of each strap along the straps' elongated dimension, between the intersections of four adjacent straps, forms a wall 100 of the fuel rod support cells 94.

Figure 5:
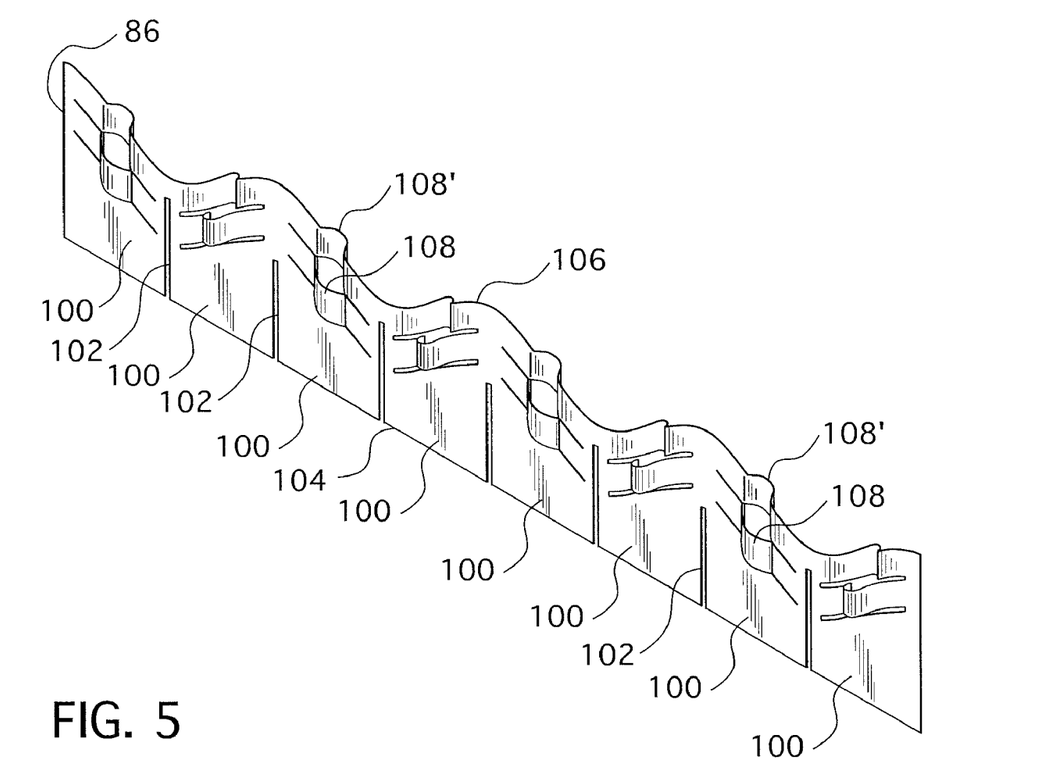
FIG. 5 is a perspective view of one of the grid straps of the grid shown in FIG. 4, that borders only fuel support cells.
Figure 11:
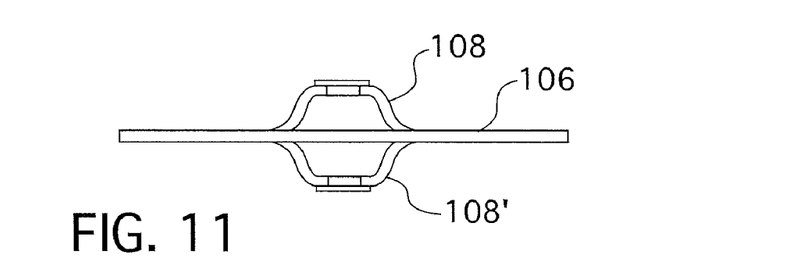
FIG. 11 is a top view of one wall of a fuel support cell of this invention with an improved dimple configuration.
Figure 12:
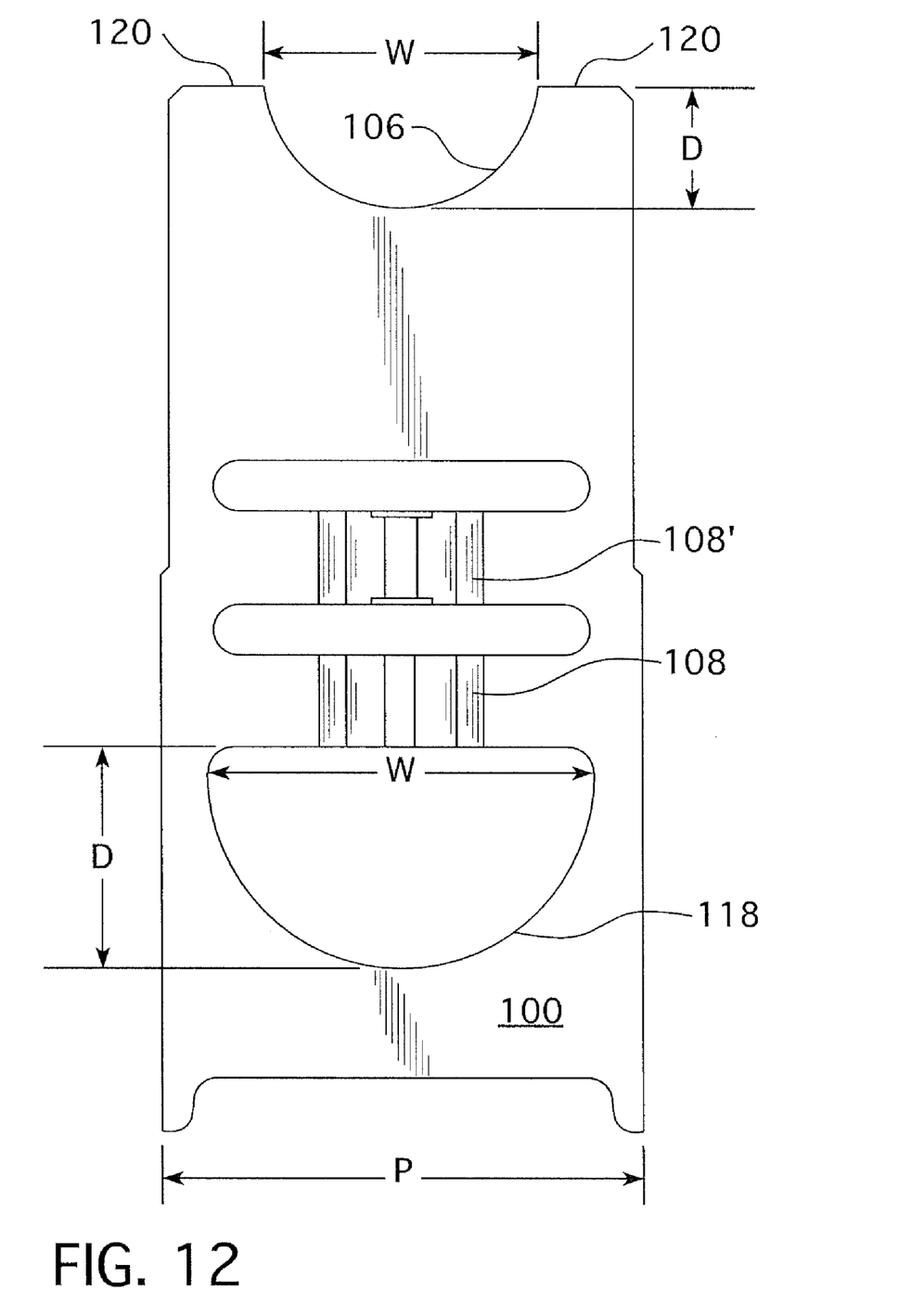
FIG. 12 is the front view of one wall of the fuel support cell that employs a curved variation of the saw tooth ligament for the trailing edge and a curved variation of the saw tooth cutout just below the dimples shown in FIG. 10.

Due to the high velocity of the coolant passing upwardly through the core and the turbulence that is generally, intentionally created to promote heat transfer from among the fuel assemblies to the coolant, the nuclear fuel rod grid straps 86 and 88 have a potential to experience vortex shedding lock-in vibration when the shedding frequency is close to the natural frequency of the strap. If the vibration reaches the natural vibration frequency of the strap, the relative vibratory motion between the grid contacts (the dimples and springs) and the fuel rod cladding can cause fretting of the cladding and can eventually result in a breach of the cladding and release of the fission by-products into the coolant. The resonant vibration can also cause cracks or other failures in the grid straps which could also lead to a cladding breach. This invention employs straps with angled trailing and leading edges that are designed to break the correlation of the vortices shed from the trailing and leading edges of the grid straps by varying the phase of the vortices to avoid strap vortex shedding lock-in vibration. The improved grid strap of this invention can better be appreciated from the views shown in FIGS. 5-11. Note FIG. 12 provides an alternate embodiment for breaking the correlation using half circle cutouts instead of angled edges. For simplicity, the portions of the straps that are shown have walls 100 which only support fuel rods and do not border the cells 96 through which the guide thimbles and instrumentation tube extend. FIG. 5 shows a perspective view of a portion of one of the straps 86 and 88 which borders on the cells that support fuel rods. A wall 100 of each cell 94 is defined between the vertical slits 102 and between the vertical slits 102 and the ends of the straps. The vertical slits 102 in the straps 86 which extend from the lower edge 104 of the strap to partially up the straps' height mate with a corresponding slit in the straps 88 which extend from the upper edge and extend partially down to form the intersection between straps at the interleaved joint. The lower edge 104 of the straps 86, 88 is hereafter referred to as the leading edge and the upper edge 106 of the straps 86, 88 is hereafter referred to as the trailing edge in as much as the coolant traverses the core from the lower edge to the upper edge.

In accordance with this invention, either one or both the leading edge 104 or the trailing edge 106 is provided with an angled contour that varies the elevation of either or both the leading edge 104 or the trailing edge 106 as the edges extend along the walls 100, longitudinally along the length of the straps. In the embodiment illustrated in FIG. 5, the leading edge is provided with a flat contour that does not vary in elevation along the wall 100 while the trailing edge 106 is provided with a curved contour that will break the correlation between the vortices, i.e., the vortices will not reinforce each other.

Figure 6:
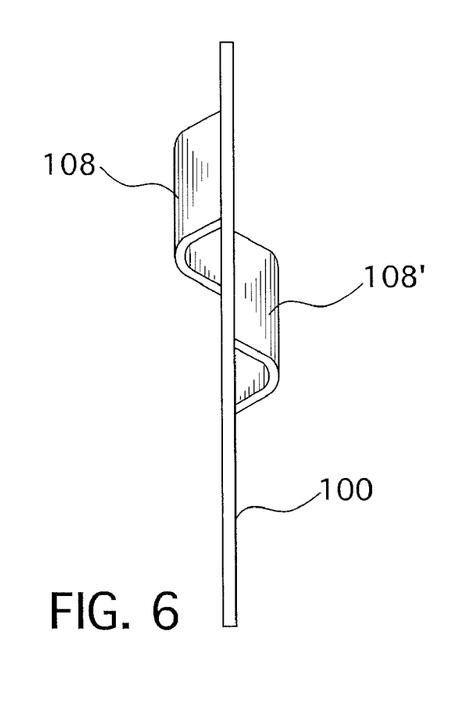
FIG. 6 is a side elevational view of the end wall of the grid straps shown in FIG. 5 that illustrates the diagonal dimples employed by the embodiment illustrated in FIG. 5.

During reactor operation in the core, the high velocity coolant flow across the grid straps causes vortex shedding lock-in vibration if the shedding frequency is close to the natural frequency of the grid straps. With the angled trailing and/or leading edges the vortex will still form along the trailing edge at each wall 100 along the strap. The vortex at each wall will have the same shedding frequency if the coolant flow velocity is the same. However, the moment (i.e., timing) of the vortices coming out of the angled edges will not be correlated because they will be out of phase. With the angled trailing edge, the delta pressure oscillations due to vortex shedding act at the different phases to cancel each other and no uniform resulting oscillating force will be formed to excite the strap. In the embodiment shown in FIG. 5, the trailing edge 106 of the wall 100 of the strap 86 is inclined at an approximately constant 45° angle between the intersections of adjacent orthogonal straps and makes a smooth rounded transition at the intersection 102 changing directions approximately 90° and similarly reversing directions at each subsequent interface with the orthogonal straps 88. Though the angle of incline was described as being approximately 45°, it should be appreciated that it can vary between 10 and 80° without detracting from the invention. The dimples 108 and 108' illustrated in FIG. 5 protrude into adjacent cells and contact and support the fuel rods. The dimples 108 and 108' are also designed at an angle to reduce the dimples' stiffness and contribute to changing the correlation of a vortices to prevent the formation of uniform oscillation forces that could result in resonant vibration of the grid strap. A side view of the dimples 108 and 108' is shown in FIG. 6.

Figure 7:
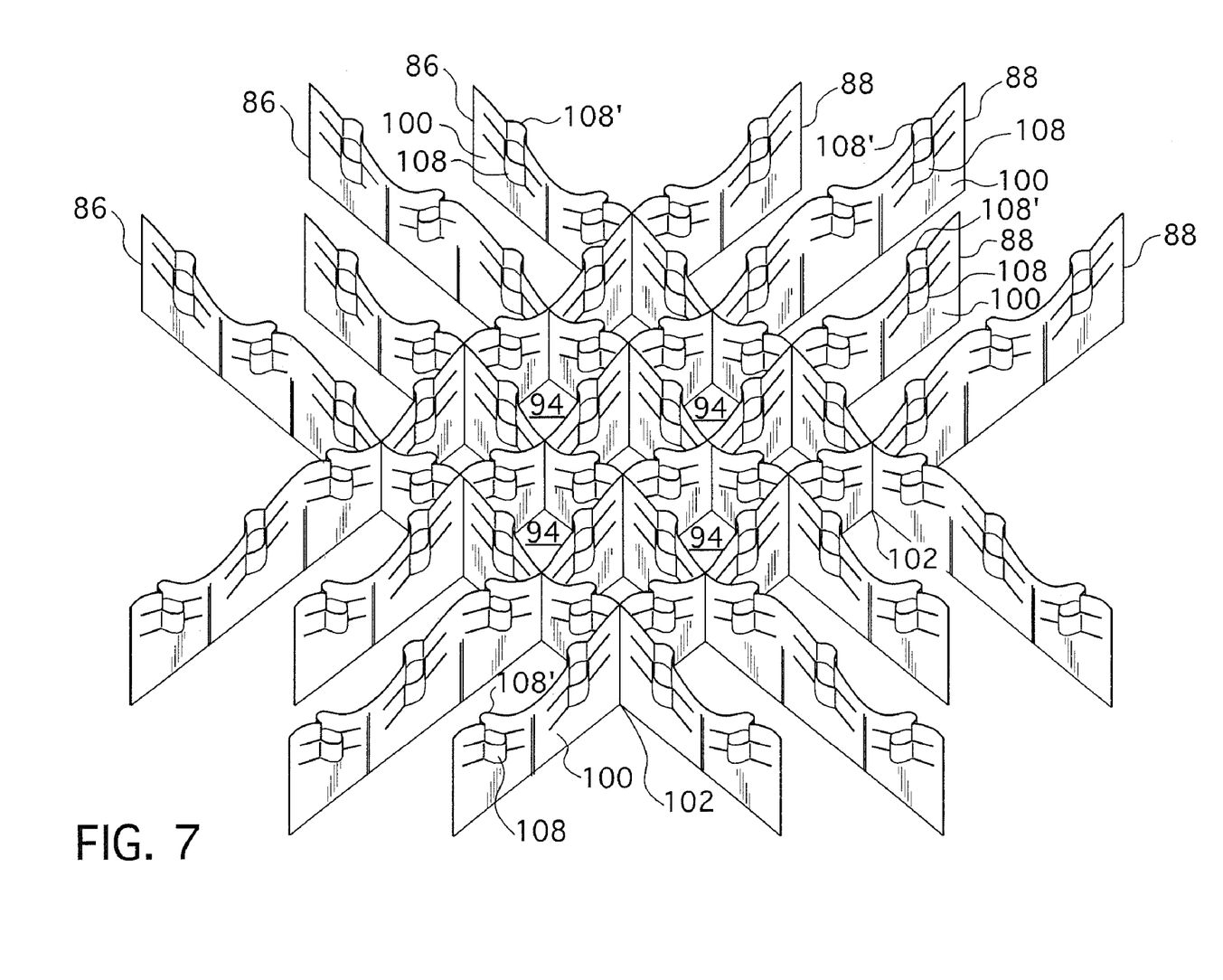
FIG. 7 is a perspective view of an egg-crate arrangement of two parallel arrays of grid straps that are orthogonally oriented to form an interior section of fuel rod support cells of the grid of this invention.
Figure 8:
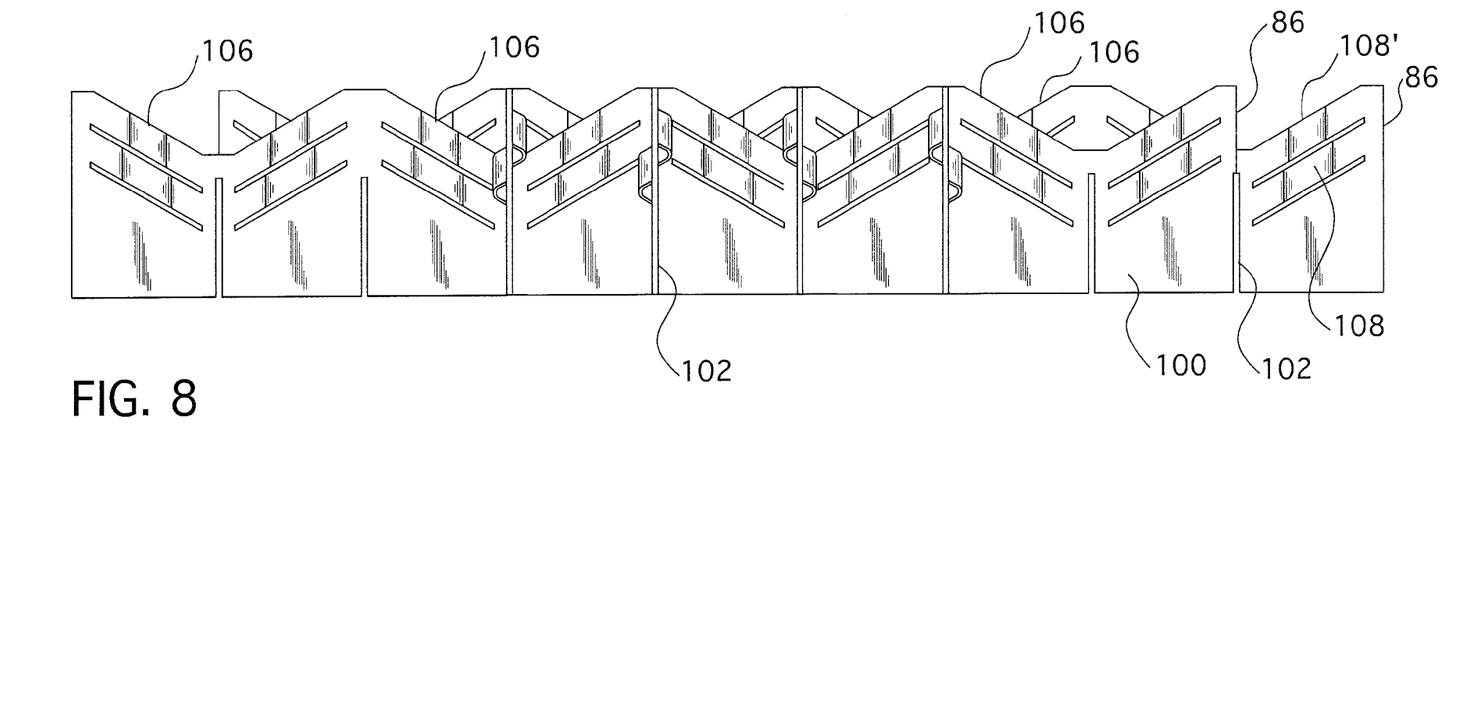
FIG. 8 is a front view of the embodiment shown in FIG. 7 that illustrates that adjacent parallel straps are preferably 180° out of phase.

FIG. 7 shows a perspective grid section constructed from an interleaved arrangement of two parallel arrays of orthogonal straps 86 and 88 with each strap formed with the angled trailing edge pattern illustrated in FIG. 5. It should be noted that the straps 86 and 88 are the same height at the intersections 102 and the straps that form the opposing walls of each cell are angled in different directions. Again, for simplicity, the strap arrangement illustrated in FIG. 7 defines cells that support fuel rods and does not illustrate the cells through which the guide thimbles and instrumentation tube pass through.

Figure 9:
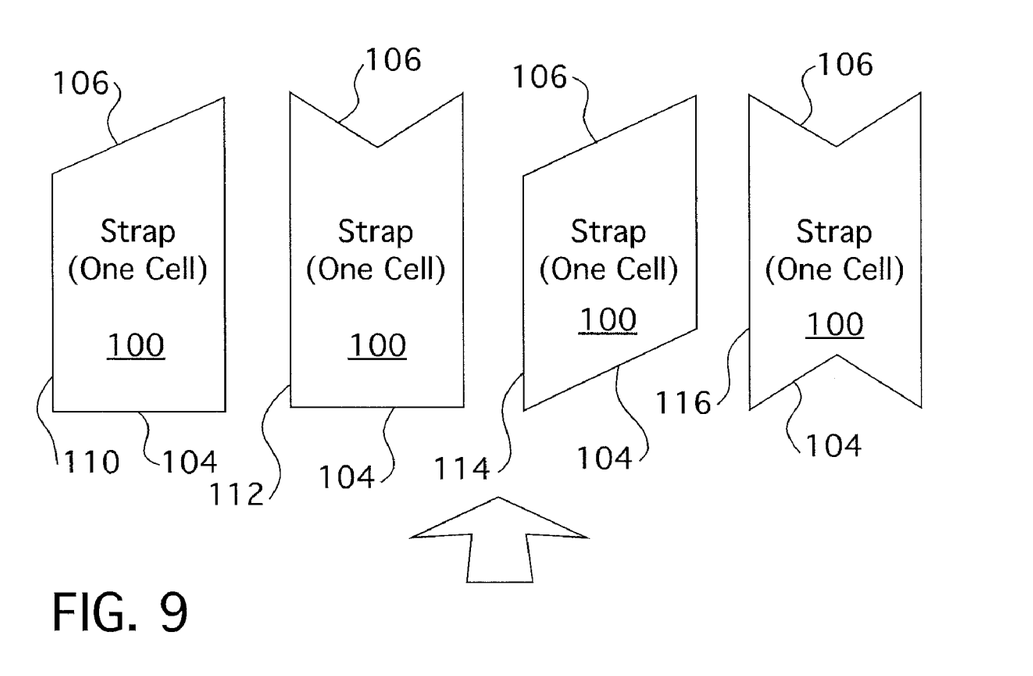
FIG. 9 illustrates four different embodiments of one wall of a fuel support cell which can be employed to achieve the objectives of this invention.

While a trailing edge 106 undulating pattern has been illustrated so far, it should be appreciated that the benefits of this invention can be achieved employing other trailing and leading edge patterns. For example, as illustrated in FIG. 9 by the wall pattern 110, the cell wall 100 can have a straight horizontal leading edge 104 and an inclined trailing edge 106 similar to that described with regard to FIGS. 5-8, except that adjacent cells may be inclined in the same direction as the pattern 110. The angled edge pattern may also vary between adjacent cells. In still another embodiment represented by cell wall pattern 112, the leading edge 104 has a straight horizontal contour while the trailing edge is formed in a saw tooth pattern which is repeated cell to cell. In another embodiment illustrated by wall pattern 114 the cell wall 100 has a leading edge 104 which is slanted parallel to the trailing edge 106 at an angle similar to that described for the embodiment illustrated in FIG. 5. Similar to that described previously, the adjacent cell walls on the same strap may be inclined in the opposite direction or they could be inclined in the same direction.

In still another embodiment, both the leading edge 104 and the trailing edge 106 may be formed in a saw tooth pattern inclined in opposite directions. Preferably in each case, the opposing walls of each cell would be inclined 180° out of phase (where 360° is the full extent of the pattern of the angled edge before it repeats itself) similar to that illustrated in FIG. 8.

Thus, employing this invention of angled trailing and leading edges in a reactor core, the vortices will still form along the trailing edge. Each vortex along the edge of the strap will have the same shedding frequency if the flow velocity is the same. However, the phases of those vortices coming out of the edge are not correlated due to the shape of the edges. Therefore, the delta pressure oscillations due to vortex shedding act at different phases. Due to the phase difference, the delta forces will cancel each other and will not form uniform resultant oscillating forces.

Figure 10:
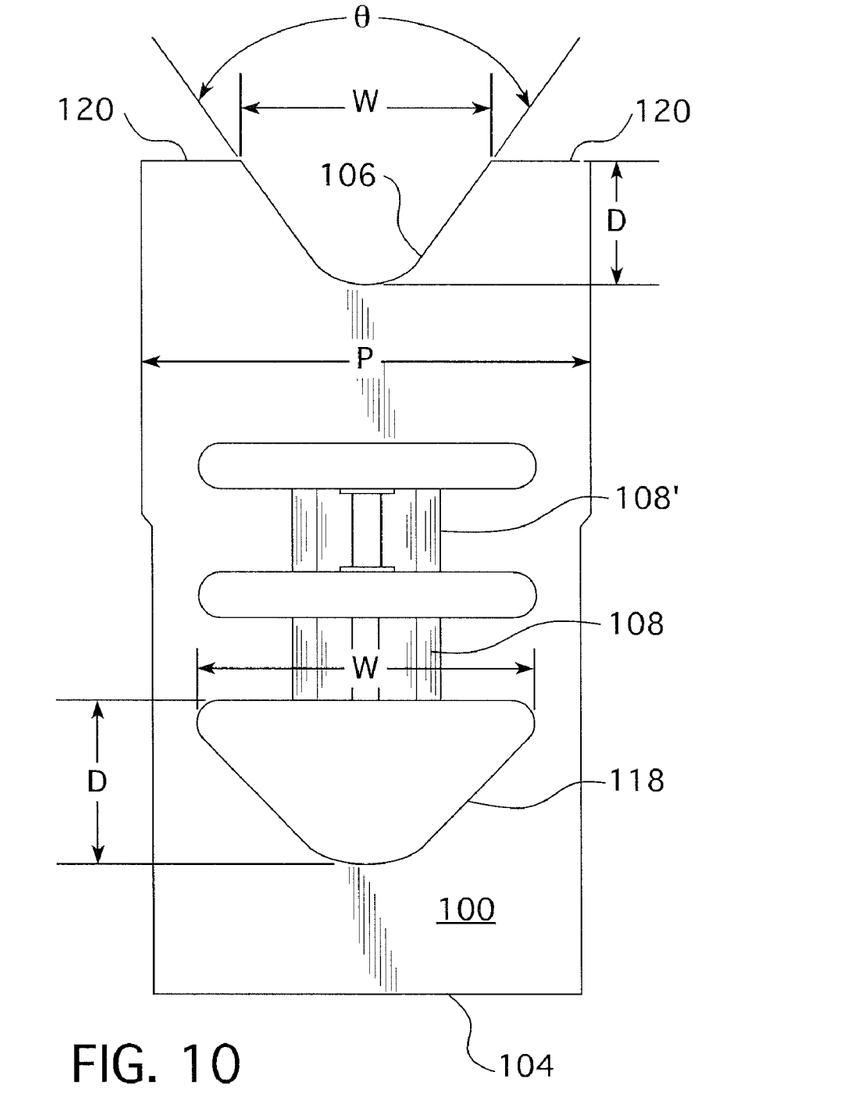
FIG. 10 is a front view of one wall of a fuel support cell that employs a saw tooth ligament for the trailing edge and a saw tooth cutout just below the dimples.

The preferred embodiment is shown in FIG. 10. FIG. 10 shows another embodiment that employs horizontal dimples 108 and 108' with a straight horizontal lower strap edge 104 and a saw tooth trailing edge 106. A saw tooth cut-out 118 is stamped below the dimple 108 to form a trailing edge for this lower strap region that alters the correlation of the vortices from this strap region. In addition, the dimples 108 and 108' are softened with gently rounded curves to further alter the vortices, as shown in FIG. 11. FIG. 10 only shows one fuel support cell wall in the grid strap. When looking at the entire grid strap, the top edge looks like a saw tooth design. The "saw tooth" term is intended to refer to the second and fourth designs from the left in FIG. 9 and the design shown in FIG. 10, i.e., with or without the ledge 120. The two cutouts 106 and 118, one at the top edge of the strap and the other below the lower dimple, are defined by the angle of the cutout and the radius at the bottom of the triangle cutouts, as shown in FIG. 10. A third parameter, the cutout width to overall strap cell width ratio, is also a parameter affecting the performance of this invention.

The angle θ of the cutouts and top trailing edges (the enclosed angle), as defined in FIG. 10 is between 20 and 160 degrees, with the optimal angle between 60 and 90 degrees. The radius ratio at the bottom of the triangle cutouts is defined by the ratio of the radius of the curve to the depth of the cutout. Using this definition, the radius ratio (R/D) range can extend from 0.1 to 0.9, with an optimal range between 0.5 and 0.7. Experimentation has shown that breaking up the profile of a fuel support cell wall edge (like 106 or 118) can be beneficial for vibration reduction. For instance, the top cutout shown in FIG. 10 has been shown to provide for less vibration than one where the W/P (width of the cutout at its widest point to the overall width of the cell wall) ratio approached 1.0. The top cutout geometry shown in FIG. 10 has a small ledge 120 on either side of the angled trailing edges with a reasonably large radius at the bottom. This geometry removes the long horizontal edge of the prior art design which has shown to exhibit significant vibration. In addition, this geometry provides three different edge configurations, horizontal, angled and radius, which in testing has been shown to be a preferred geometry to prevent vortex correlation, thus preventing high amplitude vibration. The cutout width to overall cell width ratio is between 0.1 and 0.9, with the optimal range 0.5 to 0.85. Thus, the preferred embodiment is described by a cutout angle θ, a bottom radius ratio (R/D), and a cutout width ratio (W/P).

FIG. 12 shows an alternate configuration for the top and bottom cutout. This configuration has been tried experimentally and has been shown to provide significant vibration mitigation relative to the prior art design. This configuration uses a semicircular cutout instead of a saw tooth cutout as the trailing edge for coolant flow. The concept behind this configuration is that there is no straight edge along the entire width of the trailing edge cutout, which will further prevent coolant vortices from correlating and thus reduce vibration. The geometry of this configuration should be such that the depth (D) to width (W) ratio approaches 0.5 to maximize the curvature of the cutout and reduce vortex correlation. The cutout width (W) to overall cell width (P) is also important for this alternate configuration. As shown in FIG. 12, the W/P ration should be 0.2 to 0.9, with the optimal range 0.4 to 0.6.

Figure 13:
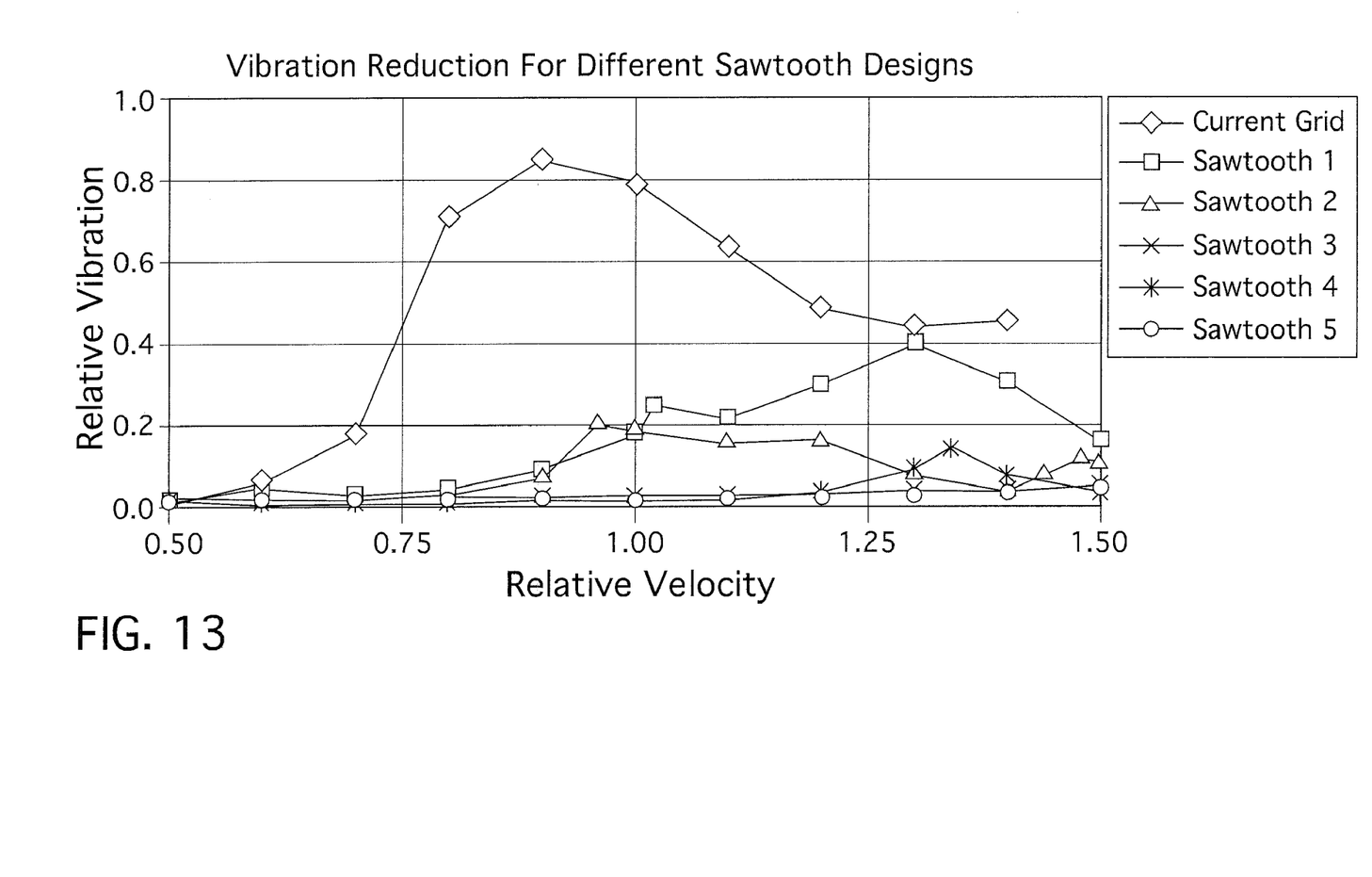
FIG. 13 is a graph of test results which illustrates the benefits derived from this invention

FIG. 13 illustrates the experimental results that were obtained that demonstrate the reduction in grid strap vibration that can be achieved by employing this invention. This figure illustrates the reduction in vibration for the variations of the saw tooth design of FIG. 10. This data shows that for different values of the cutout angle θ, a bottom radius ration (R/D), and a cutout width ration (W/P), the vibration reduction will be different. This data, and other data like it, was used to define the ranges for these parameters set forth above, including the optimal ranges.

Accordingly, while specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breath of the appended claims and any and all equivalents thereof.

What is claimed is:

1. A fuel assembly for a nuclear reactor comprising:
a parallel, spaced array of a plurality of elongated nuclear fuel rods supported between a lower nozzle and an upper nozzle and having an axial length along the elongated dimension of the nuclear fuel rods;
a plurality of spaced support grids arranged in tandem along the axial length of the fuel rods, between the upper nozzle and the lower nozzle, at least partially enclosing an axial portion of the circumference of each fuel rod within a corresponding support cell of the support grids to maintain a lateral spacing between fuel rods, at least one of the support grids comprising;
a plurality of elongated, intersecting straps that define the support cells at the intersection of each four adjacent straps that surround the nuclear fuel rods, a length of each strap along its elongated dimension, between the intersections of the four adjacent straps forming a wall of the corresponding support cell, with each wall of the cells that surround fuel rods having a lower leading edge and an upper trailing edge that are substantially in the plane of the corresponding strap with at least one of the leading edge and the trailing edge extending in between the intersections of adjacent straps at an angle substantially deviating from an angle of an axis of the elongated dimension of the straps and having substantially the same elevation at adjacent intersections.

2. The fuel assembly of claim 1 wherein the intersection of the straps are interleaved in an egg-crate arrangement.

3. The fuel assembly of claim 1 wherein the walls of the intersecting straps are at substantially a same height at the intersection.

4. The fuel assembly of claim 1 wherein the angle of deviation comprises a first angle and a second angle and the lower leading edge and the upper trailing edge extend from the intersection between straps respectively at the first and second angles.

5. The fuel assembly of claim 4 wherein the first and second angles are in opposite directions.

6. The fuel assembly of claim 4 wherein the first and second angles are equal.

7. The fuel assembly of claim 1 wherein one or both of the leading edge or the trailing edge of at least one wall of at least some of the cells that surround fuel rods starts at a first elevation within proximity of a first of the intersections between straps and extends along the elongated dimension of the corresponding strap to a second elevation before intersecting an adjacent strap.

8. The fuel assembly of claim 7 wherein the second elevation is lower than the first elevation.

9. The fuel assembly of claim 7 wherein the second elevation is higher than the first elevation.

10. The fuel assembly of claim 7 wherein the one or both of the leading edge or the trailing edge extends from the second elevation to a third elevation before the intersection with an adjacent orthogonal strap wherein the third elevation is different than the second elevation.

11. The fuel assembly of claim 10 wherein the second elevation is higher than the first and third elevations on the leading edge and the second elevation is lower than the first and third elevations on the trailing edge.

12. The fuel assembly of claim 1 wherein at least some of the walls of the support cells include a dimple that has a saw tooth opening cut in the wall below the dimple.

13. The fuel assembly of claim 12 wherein the dimple is substantially rounded at a plurality of corners at which it changes direction into the support cell.

14. The fuel assembly of claim 12 wherein at least some of the walls of the support cells that include a dimple that has a saw tooth opening below the dimple also include a saw tooth ligament as the trailing edge.

15. The fuel assembly of claim 1 wherein either the leading edge, the trailing edge or both the leading edge and the trailing edge are formed as a cutout in the wall of the support cell that has at least a first side that is inclined towards a second side with the first and second sides connected at the bottom with a smooth curved transition.

16. The fuel assembly of claim 15 wherein the cutout extends substantially over a width of the wall.

17. The fuel assembly of claim 15 wherein the cutout that forms the leading edge is above a bottom edge of the strap.

18. The fuel assembly of claim 17 wherein the wall has either a dimple or spring protruding into the support cell and the cutout that forms the leading edge is formed between the bottom edge of the strap and the dimple or spring.

19. The fuel assembly of claim 15 wherein the cutout is in the form of a triangle having a relatively flat horizontal base at the top and a rounded lower tip.

20. The fuel assembly of claim 19 wherein the triangle is substantially an isosceles triangle.

21. The fuel assembly of claim 19 wherein an enclosed angle of the first and second sides is between 20 and 160 degrees.

22. The fuel assembly of claim 21 wherein the enclosed angle of the first and second sides is between 60 and 90 degrees.

23. The fuel assembly of claim 19 wherein the radius at the rounded lower tip is defined by a ratio of the radius to the depth which is the height of the triangle and the ratio is between 0.1 and 0.9.

24. The fuel assembly of claim 23 wherein the ratio is between 0.5 and 0.7.

25. The fuel assembly of claim 19 wherein a ratio of a width of the cutout to a width of the wall is between 0.1 and 0.9.

26. The fuel assembly of claim 25 wherein the ratio is between 0.5 and 0.85.

27. The fuel assembly of claim 1 wherein either the leading edge, the trailing edge or both the leading edge and the trailing edge are formed substantially as a half circle with an open end at the top.

28. The fuel assembly of claim 27 wherein a ratio of a height of the half circle to a width of the half circle at its widest point is approximately 0.5.

29. The fuel assembly of claim 27 wherein a ratio of a width of the half circle at its widest point to a width of the support cell is between 0.2 to 0.9.

30. The fuel assembly of claim 29 wherein the ratio is between 0.4 to 0.6.

31. A support grid for a nuclear fuel assembly comprising:
a plurality of elongated, intersecting straps some of which define a support cell at the intersection of four adjacent straps that surround a nuclear fuel rod, a length of each strap along its elongated dimension, between the intersections of the four adjacent straps forming a wall of the corresponding support cell, with each wall of the cells that surround fuel rods having a lower leading edge and an upper trailing edge that are substantially in the plane of the corresponding strap with at least one of the leading edge and the trailing edge extending in between the intersections of adjacent straps at an angle substantially deviating from an angle of an axis of the elongated dimension of the straps: and
wherein at least some of the walls of the support cells include a dimple or a spring that has a saw tooth, "V" shaped or Triangle shaped opening cut in the wall below the dimple or spring.

32. A fuel assembly for a nuclear reactor comprising:
a parallel, spaced array of a plurality of elongated nuclear fuel rods supported between a lower nozzle and an upper nozzle and having an axial length along the elongated dimension of the nuclear fuel rods;
a plurality of spaced support grids arranged in tandem along the axial length of the fuel rods, between the upper nozzle and the lower nozzle, at least partially enclosing an axial portion of the circumference of each fuel rod within a corresponding support cell of the support grids to maintain a lateral spacing between fuel rods, at least one of the support grids comprising;
a plurality of elongated, intersecting straps that define the support cells at the intersection of each four adjacent straps that surround the nuclear fuel rods, a length of each strap along its elongated dimension, between the intersections of the four adjacent straps forming a wall of the corresponding support cell, with each wall of the cells that surround fuel rods having a lower leading edge and an upper trailing edge that are substantially in the plane of the corresponding strap with at least one of the leading edge and the trailing edge extending in between the intersections of adjacent straps at an angle substantially deviating from an angle of an axis of the elongated dimension of the straps: and
wherein at least some of the walls of the support cells include a dimple or a spring that has a saw tooth opening cut in the wall below the dimple or spring.

33. The fuel assembly of claim 32 wherein the angle of deviation comprises a first angle and a second angle and the lower leading edge and the upper trailing edge extend from the intersection between straps respectively at the first and second angles.

34. The fuel assembly of claim 33 wherein the first and second angles are in a same direction.

35. The fuel assembly of claim 32 wherein one or both of the leading edge or the trailing edge of at least one wall of at least some of the cells that surround fuel rods starts at a first elevation at a first of the intersections between straps and extends along the elongated dimension of the corresponding strap to a second elevation before intersecting an adjacent strap.

36. The fuel assembly of claim 35 wherein the second elevation is at the intersection of the adjacent second strap and the second elevation is one of either greater or lesser than the first elevation.

37. The fuel assembly of claim 36 wherein the one or both of the leading edge or the trailing edge extend along the elongated dimension of the strap from the adjacent strap to a third elevation at the intersection of a third orthogonal strap where the third elevation is the other of either the greater or lesser than the second elevation.

38. The fuel assembly of claim 37 wherein the first and third elevations are substantially the same.

39. The fuel assembly of claim 37 wherein one or both of the leading edge or the trailing edge on adjacent parallel straps have a same undulating pattern, but opposing walls are 180 degrees out of phase.

* * * * *